(12) United States Patent
Gower

(10) Patent No.: US 6,865,852 B2
(45) Date of Patent: Mar. 15, 2005

(54) FLEXIBLE WIND ABATEMENT SYSTEM

(75) Inventor: Ted Gower, North Palm Beach, FL (US)

(73) Assignee: Targus International, Inc., Palm Beach Gardens, FL (US)

(*) Notice: Subject to any disclaimer, the term of this patent is extended or adjusted under 35 U.S.C. 154(b) by 144 days.

(21) Appl. No.: 10/033,030

(22) Filed: Nov. 9, 2001

(65) Prior Publication Data

US 2002/0134414 A1 Sep. 26, 2002

Related U.S. Application Data

(63) Continuation-in-part of application No. 09/565,211, filed on May 4, 2000, now Pat. No. 6,325,085, which is a continuation of application No. 09/270,249, filed on Mar. 15, 1999, now Pat. No. 6,176,050, which is a continuation-in-part of application No. 08/861,209, filed on May 21, 1997, now abandoned.

(51) Int. Cl.⁷ ................................................. E04B 1/00
(52) U.S. Cl. ..................... 52/222; 52/4; 52/23; 52/155; 52/202; 52/204.1; 52/273; 52/506.01; 135/90; 135/222; 248/85; 248/87; 248/156; 160/327; 160/368.1; 160/371; 160/DIG. 1; 245/2; 245/5
(58) Field of Search ................................. 52/4, 23, 155, 52/202, 506.01, 204.1, 222, 273; 135/90, 222; 160/327, 368.1, DIG. 19, 371; 248/85, 87, 156; 245/2, 5

(56) References Cited

U.S. PATENT DOCUMENTS

| 3,715,843 A | * | 2/1973 | Ballinger .......................... 52/3 |
| 3,805,816 A | | 4/1974 | Nolte |
| 3,862,876 A | | 1/1975 | Graves |
| 3,949,527 A | | 4/1976 | Double et al. |
| 4,283,888 A | | 8/1981 | Cros |
| 4,397,122 A | | 8/1983 | Cros |
| 4,429,952 A | * | 2/1984 | Dominguez .................. 359/591 |
| 4,590,714 A | | 5/1986 | Walker |
| 4,644,684 A | * | 2/1987 | Verbeeck ........................ 47/31 |
| 4,858,395 A | | 8/1989 | McQuirk |
| 4,905,821 A | * | 3/1990 | Corbett ..................... 206/45.24 |
| 4,932,457 A | * | 6/1990 | Duncan ....................... 160/380 |
| 5,192,574 A | * | 3/1993 | Hunt et al. .................. 426/549 |
| 5,237,788 A | * | 8/1993 | Sandow ........................ 52/200 |
| 5,347,768 A | | 9/1994 | Pineda |
| 5,383,950 A | * | 1/1995 | Hashemi et al. .............. 65/348 |
| 5,466,503 A | * | 11/1995 | Dischler ....................... 428/43 |
| 5,522,184 A | | 6/1996 | Oviedo-Reyes |
| 5,579,794 A | * | 12/1996 | Sporta ...................... 135/88.01 |
| 5,599,440 A | * | 2/1997 | Stangeland et al. ......... 208/148 |
| 5,632,839 A | * | 5/1997 | Kish et al. ................... 156/194 |
| 5,639,806 A | * | 6/1997 | Johnson et al. ............. 523/208 |
| 5,720,137 A | * | 2/1998 | Rodriquez .................... 52/202 |
| 5,791,090 A | * | 8/1998 | Gitlin et al. ...................... 52/4 |
| 5,915,449 A | * | 6/1999 | Schwartz .................... 160/330 |
| 6,176,050 B1 | * | 1/2001 | Gower ......................... 52/222 |
| 6,230,455 B1 | * | 5/2001 | Arehart et al. ................ 52/202 |

* cited by examiner

Primary Examiner—Carl D. Friedman
Assistant Examiner—Christy M. Green
(74) Attorney, Agent, or Firm—McHale & Slavin, P.A.

(57) ABSTRACT

A device for protection of property against high winds comprising a flexible material of predetermined strength and stretch characteristics, and in the form of a panel or several panels, utilized to protect the side of a structure including its windows and doors from the strong winds and debris impacts occurring during a hurricane. The device is anchored in a manner to space it out from the area being protected according to formula provided, and can safely dissipate substantial impacting energy. The preferred embodiment attaches to an overhanging eave and the ground below protecting in addition to the windows and doors, plantings, outdoor furniture, decorative shutters, downspouts, and such as are enclosed behind the barrier. Several methods of storage and deployment of said curtain are described including rolling, sliding, and converting to awning. The barrier has the added feature of acting as a tie down in certain applications.

11 Claims, 5 Drawing Sheets

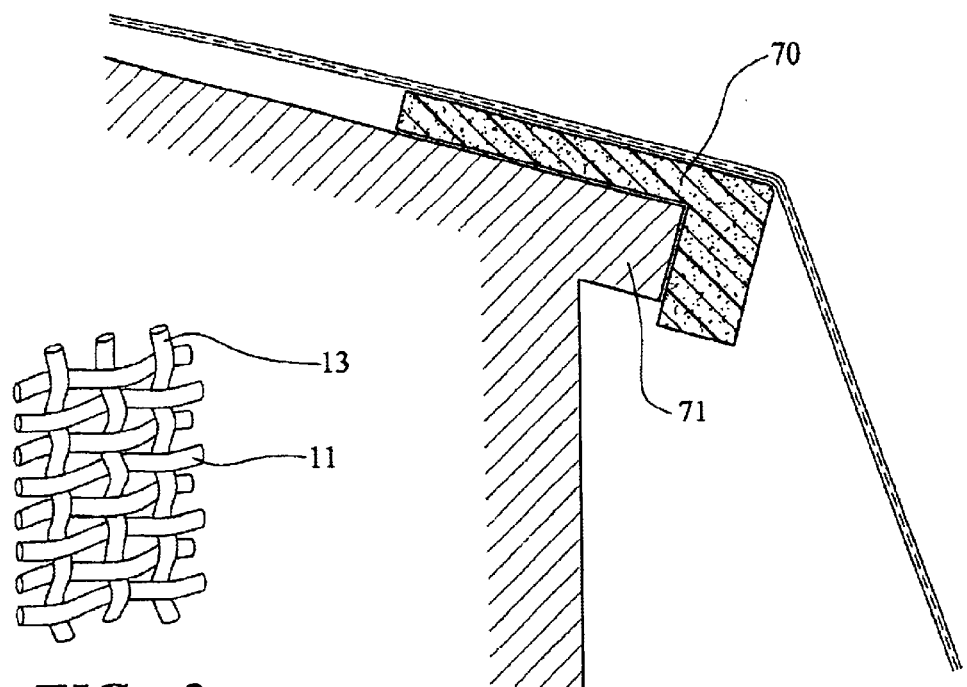
FIG. 3
FIG. 4
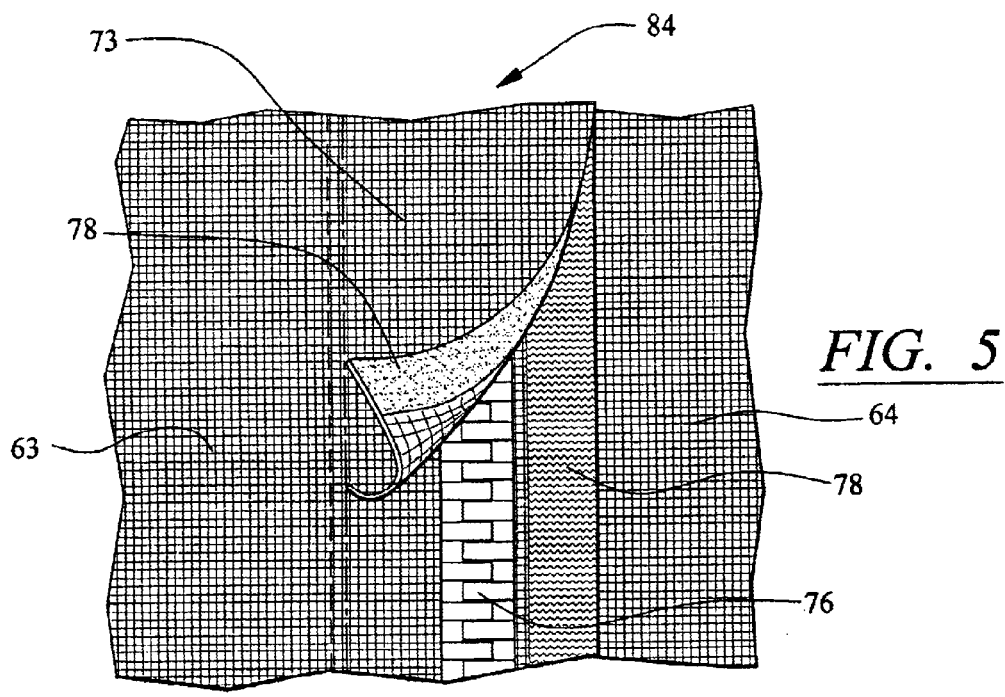
FIG. 5

FLEXIBLE WIND ABATEMENT SYSTEM

This application is a continuation-in-part of Ser. No. 09/565,211 filed May 4, 2000, now U.S. Pat. No. 6,325,085, which is a continuation of Ser. No. 09/270,249, filed Mar. 15, 1999, now U.S. Pat. No. 6,176,050 B1, which is a continuation-in-part of Ser. No. 08/861,209, filed May 21, 1997 now abandoned. The content of all the prior applications and the prior art cited in each of the applications is incorporated herein by reference.

TECHNICAL FIELD

This invention relates to the protection of property against high winds and, in particular, to a flexible protective barrier device for securing property from damage from the wind itself and from the impact of foreign objects carried by wind as occasioned by hurricanes, tornadoes and the like.

BACKGROUND ART

As is known by one skilled in the art of protecting buildings and the like from damage caused by missile-like objects that are occasioned by the heavy winds of hurricanes or tornadoes, there are commercially available variations of hurricane protective devices, often called shutters, that fasten immediately over the frangible area to be protected. These devices are typically expensive to purchase, cumbersome, made from stiff, heavy material such as steel and aircraft quality aluminum alloy or occasionally plastic with reinforcing. Many need to be manually connected and then removed and stored at each threat of inclement weather. Many require unsightly and difficult-to-mount reinforcing bars at multiple locations. Further, these known shutters are usually opaque, preventing light from entering a shuttered area and preventing an inhabitant from seeing out. Likewise, it is desirable that police be able to see into buildings to check for inhabitants and to prevent looting which can be a problem in such circumstances. Missiles, even small not potentially damaging missiles, striking these heretofore known shutters create a loud, often frightening bang that is disturbing to inhabitants being protected.

Standardized testing requiring these protective devices to meet certain standards of strength and integrity has been introduced for various utilizations and locales. In order to qualify for use where said testing requirements apply, the strength and integrity characteristics of these protective devices must be predictable and must be sufficient to meet said standards. Additionally, and as is obvious to one skilled in the art, it is beneficial to qualify for said standards even in situations in which standards do not apply. As a result of said standards, many undesirable aspects of the heretofore known shutters have been acerbated. They have become more cumbersome, more bulky, heavier, more expensive, more difficult to store, and remain generally opaque and noisy when impacted. To incorporate sufficient strength to meet said requirements, weight and bulk become a problem over six feet in span. The useable span (usually height) of the heretofore known shutters that meet said standards may be limited to eight feet or less. This makes protecting large windows, for example, or groupings of windows, with the heretofore known devices cumbersome, expensive and impractical. Devices that are intended to be deployed in a roll down manner either manually, automatically, or simply by motor drive, have been difficult to strengthen sufficiently to pass the test requirements and require unsightly reinforcing bars every few feet.

Prior to the introduction of said standards, an ordinary consumer had very little useful knowledge of the strength and integrity of said shutters. It is believed shutters of the pre-standard era were very weak such that all would fail the present standardized testing. It should be understood that the standards are not intended to provide a shutter that will protect in all situations. As the hurricane conditions can be very violent and destructive, the standards are not intended to require strength and integrity sufficient to protect in all circumstances. The standards simply provide a benchmark as to strength and integrity. Said strength and integrity of the shutters can now be measured.

There are a sundry of patents that teach the utilization of knitted or woven fabric such as netting, tarpaulins, drop cloths, blankets, sheets wrapping and the like for anchoring down recreational vehicles, nurseries, loose soil and the like. But none of these are intended for, nor are capable of withstanding the forces of the missile-like objects that are carried by the wind in hurricanes. Examples where fabric or netting material that encapsulates the unit to be protected as by covering the entire unit and fastening the ends of the fabric to the ground are disclosed in the following patents. U.S. Pat. No. 3,862,876 issued to Graves, U.S. Pat. Nos. 4,283,888 and 4,397,122 issued to Cros, U.S. Pat. No. 4,858,395 issued to McQuirk, U.S. Pat. No. 3,949,527 issued to Double et al., U.S. Pat. No. 3,805,816 issued to Nolte, U.S. Pat. No. 5,522,184 issued to Oviedo-Reyes, U.S. Pat. No. 4,590,714 issued to Walker and U.S. Pat. No. 5,347,768 issued to Pineda. The U.S. Pat. No. 5,522,184 for example, provides a netting that fits flush over the roof of a building and uses a complicated anchoring system to tie down the netting to strengthen the building structure against hurricanes and wind storms.

Certain types of flexible material that are capable of withstanding high wind loading or impact loads without bursting, can be disposed in front of the building or other structures intended to be protected, and anchored on opposing edges, to form a curtain sufficiently spaced from the frangible area to contain the impact of foreign objects hurled by the high winds. For example, in a building the top edge of the fabric may be anchored to the eave of the roof and the bottom of the fabric may be attached to anchors imbedded in the ground or cement, so as to present a curtain adequately spaced out from and in front of the structure of the building to be protected. Not only does this afford frontal protection but, properly located and attached, it also serves to tie down the roof and protect it from blowing off. The winds that would ordinarily blow off the roof exert a force on the fabric which, in turn, exerts a downward force on the roof to act against the lifting forces tending to lift the roof.

Thus, what is lacking in the art is a flexible protective barrier constructed from a mesh material that can be easily stored and deployed for protecting the frangible portion of a structure from objects carried by the wind.

SUMMARY OF THE INVENTION

This invention contemplates the use of a flexible barrier, preferably a reasonably transparent, woven synthetic textile that is able to satisfy stringent testing requirements. Knitted or extruded material can be an alternative if the material itself meets the criteria described later herein. The use of this invention allows very large areas with spans of greater than 25 feet to be covered with ease. Thus most window groupings, even several stories of a building, could be readily protected. This invention is light in weight, easy to use, does not require reinforcing bars, can be constructed in varying degrees of transparency, can be weather tight, is economical, and is capable of dissipating far greater forces without damage than the heretofore known stiff devices. Missiles striking this barrier make very little sound. This invention is suitable to be configured with the necessary motor and supportive devices for automatic deployment.

Heretofore known devices have internal stiffness and rigidity that resists deflection, or bending. It is this stiffness that stops the missile short of the frangible surface being protected. This invention does not have rigidity but rather is very flexible, which give several positive features including allowing for ease of storage as by rolling or folding. The flexible barrier of the invention is placed a distance out from the surface to be protected. An impacting missile stretches the barrier until it decelerates to a stop or is deflected. The barrier material has a predetermined tensile strength and stretch that makes it suitable for this application. Said known strength and stretch, together with the speed, weight and size of the impacting missile, all of which are given in test requirements, permit design calculation to ascertain barrier deflection at impact. This deflection is a determinate of the minimum distance that this barrier is to be spaced out from the frangible area to be protected. Other determinates which may be included are additional deflection from wind pressure and from slack from an improper installation.

The barrier of this invention is mounted farther away from the surface to be protected than the prior art structures, thereby providing room for a longer deceleration of impacting flying debris (missiles). Thus greater energy from a missile can be safely dissipated than is possible with the prior art structures, and the energy which can be safely dissipated is calculable.

The distance which the barrier is spaced out from the frangible surface need not be great and is quite workable with existing structures. Even though the distance is not great, said distance does allow a significantly increased distance and time of deceleration such that the barrier will stop far stronger impacts than with the heretofore known rigid devices. In simple terms, the missile is slowed to a stop by elasticity as the barrier stretches. The greater the impact, the greater the stretch. Thus the building is not subjected to an abrupt harsh blow as the impact on the shutter is transferred to the building. The energy transfer is much gentler and less destructive than with the rigid devices.

It will be obvious to one skilled in this art that this device goes beyond merely hanging a curtain in front of a structure and hoping wind born missiles will be stopped. This invention provides a method of calculating the minimum spacing of said barrier from the frangible surface and provides understanding as to the strength and integrity of said barrier. This invention contemplates using a screen-like fabric with interstices that permit the light to pass through and that is reasonably transparent. Of course, if interstices are utilized in the fabric makeup, the size of the interstices must consider the size of the missiles such that the missiles do not pass therethrough. If transparency is not desirable, the fabric can be made sufficiently dense to minimize or eliminate the interstices. To assure a long life, the material of the fabric preferably would be resistant to the ultra violet radiation, and to biological and chemical degradation such as are ordinarily found outdoors. This invention contemplates either coating the material or utilizing material with inherent resistance to withstand these elements. A synthetic material such as polypropylene has been found to be acceptable. An example of a coated material is vinyl coated polyester. Materials intended to be used outdoors in trampolines, for example, are likely candidates for use in this invention. Black colored polypropylene is most resistant to degradation from ultra violet radiation. Other colors and vinyl coated polyester are sufficiently resistant, particularly if the barrier is not intended to be stored in direct sunlight when not in use.

The preferred embodiment allows air passage through it, albeit at substantially reduced rate. An upwind pressure of 1" of mercury, which roughly translates into a 100 miles per hour (mph) wind, forces air through at 250 cubic feet per minute (cfm) or approximately 3 mph. The amount of air passage depends on the interstice size. If a weather tight and transparent barrier is desired, the polypropylene material may be laminated with a flexible clear plastic skin.

It is of importance that the material affords sufficient impact protection to meet the regulatory agencies' requirements in order for this to be a viable alternative to other hurricane protective mechanisms. While stiff structures, such as panels of metal, are easily tested for impact requirement and have certain defined standards, fabrics on the other hand, are flexible and react differently from stiff structures. Hence the testing thereof is not as easily quantified as the stiffer materials. However, certain imperial relationships exist so that correlation can be made to compare the two mediums. Typically, the current impact test of certain locales requires a wood 2×4 stud be shot at the barrier exerting a total force of approximately 230 pounds, or 61.3 pounds per square inch (psi), over its frontal (impacting) surface. This impact and resultant force relate to the Mullen Burst test commonly used by manufacturers to measure the bursting strength of their fabrics. Thus the impact test heretofore used on rigid devices will work equally well on this flexible device.

The preferred embodiment of this invention would use a textile of the type typically used in trampolines which would burst at 675 psi or a total of 2,531.25 pounds over the same 3.75 square inch frontal surface of the nominal 2×4 test missile and would stretch 21% immediately prior to failure. The strength and stretch characteristics of the material are known. The strength of this fabric is more than eleven (11) times the 230 pounds of strength required to withstand the above-described 2×4 missile test as presently required by said regulatory agencies. Stronger fabrics are available. Others are available in various strengths, colors and patterns. The maximum deflection can readily be calculated and hence the distance that the fabric must be spaced from the surface being protected can be easily ascertained.

As one skilled in this art will appreciate, the reason for the utilization of stiff materials for protection against the high winds and missile-like objects propelled thereby is because heretofore known barriers are mounted close to the frangible object being protected. Obviously, if the protective material is mounted close to the protected surface, it must necessarily be stiff in order to stop the missile short of the protected frangible surface. In such a situation, impacting missiles are required to come to an abrupt stop. Such abrupt stop of the missile on impact with the surface of the protecting structure is less desirable because the rapid energy dissipation has the propensity to cause damage not only to the protective device, but to the structure being protected as well. An extended controlled deceleration is not available if the barrier is mounted close to the frangible surface.

The use of flexible fabric distanced out from the frangible area as a protective barrier allows extended deceleration. When the strength and stretch properties of the fabric are known and allowed for, the extended deceleration becomes controlled. By mounting the protective barrier some distance from the frangible surface, a distance that is calculable, the missile can be decelerated to a stop prior to contacting the frangible surface. In other words, in any situation where the missile must stop prior to impacting the frangible surface being protected, it is desirable to decelerate the missile through an extended controlled deceleration. This invention does precisely that.

An extended deceleration has much less propensity to cause damage than an abrupt deceleration. Since the use of a flexible material as a protective barrier affords an extended deceleration, very strong impacts can be withstood. It is contemplated that this invention, using the proper material and the proper assembly, will be sufficient to meet all foreseeable impact test requirements and regulations for wind and debris protection. Such requirements and regulation would include more severe tests being contemplated for specialized, high protection, shelters.

Thus, an object of this invention is to provide a barrier made from fabric to protect the frangible portions of a building and the like. A feature of this invention is spacing the barrier out from and in front of the frangible area to be protected by attaching two opposing edges to anchors located so as to position the barrier as described. Another feature is the formula for calculating minimum spacing.

For example, one edge of the fabric can be anchored to the overhang of the roof or other high structure and the opposite edge of the span to the ground or low structure to provide a barrier spaced from and in front of the object to be protected. The lower anchors can be attached to the ground by imbedding in cement or other ground attachment such as tie downs or stakes and the like and providing grommets, rings or other attachments in the fabric to accept a clamp, cable, rope, and the like. The barrier is sufficiently spaced from the structure being protected in order to absorb and dissipate the energy from impact prior to the impacting object reaching the structure. The deceleration of the impacting object is extended in comparison to a stiff barrier.

The curtain-like barrier of this invention is characterized as a reasonably transparent barrier with strength and simplicity that is unattainable with the heretofore known barriers. Wind loading on windows is eliminated. Impact by a missile does not cause a large bang, and is not disturbing. Frame harmonics are reduced or eliminated, such harmonics are known to cause catastrophic failure of structures. The envelope of the structure is secured even if a window has failed. Wind lift is spoiled to prevent uplifting of roofs.

It is easy to install, requires low maintenance and has low acquisition cost. There is much flexibility with storage. It can either be left in place or rolled much as a shade, or slid out of the way much as a curtain, so as not to obstruct the translucent of the window or interfere with the aesthetics of the building. It can also be fully removed and stored out of the way, or swung up to form a canopy when not in use as a protective barrier. It is preferable but not essential, that the material selected to be used in the netting fabric of this invention be inherently resistant to elements encountered in the outdoors or can be coated with coatings that afford resistance to these elements. Another feature of this invention is that it is capable of providing the dual function of protection against flying missiles as well as providing anchoring capabilities, such as tying down the roof of the building or structure being protected to prevent it from being lifted off.

Another feature of this invention is that it can be reasonably transparent if desired without adversely affecting the integrity of the barrier.

Another objective of this invention is that wind loading on windows is eliminated wherein the wind load is transferred to the surrounding support structure.

Still another objective of this invention is to reduce or eliminate structure harmonics caused by high winds and the resulting structure failure caused by such vibrations.

Yet still another objective of this invention is to maintain the envelope of the structure to prevent uplifting of the roof support by wind entering of the structure.

Another objective of this invention is to provide a means to spoil wind lift that may be otherwise cause a roof structure to detach from a structure.

Another feature of this invention is that missile impact is reasonably quiet and not a loud frightening bang as with heretofore known rigid devices.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF DRAWINGS

FIG. 3 is a perspective of the barrier fabric;

FIG. 4 is a detailed showing of alternative mechanism for attaching the barrier to a structure;

FIG. 5 is a partial view illustrating a panel edge closing;

DETAILED DESCRIPTION OF THE PREFERRED EMBODIMENT

The invention does not derive its strength from stiffness or rigidity but rather from its bursting strength and stretch, with the latter acting like a spring to gradually decelerate any impacting missile. To be able to calculate the minimum distance that the barrier must be placed out from the area to be protected, the frontal area, weight and speed of the test missile must also be known. Wind speed may become a significant factor in large spans.

There are many additional desirable characteristics of this invention such as transparency, resistance to weathering, light weight, ease of installation, deployment and storage, economy.

While this invention is shown in its preferred embodiment as being utilized to protect the windows and overhang roof of a structure, it is to be understood that this item has utility for other items requiring protection and is applicable to other types of structures. Where appropriate, the barrier can be deployed horizontally or at any angle as well as the vertical as shown in FIG. 1.

Figure 1:
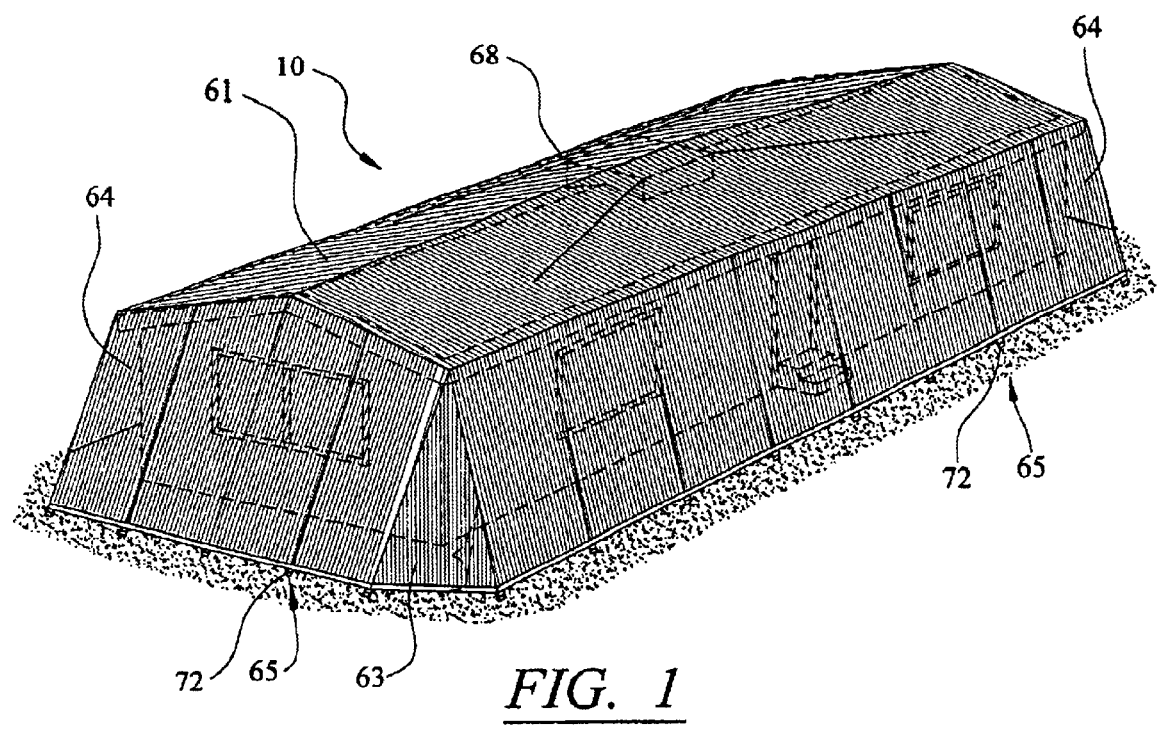
FIG. 1. is a partial view in perspective and schematic illustrating this invention in the deployed position and attached a building.

Reference is now made to FIG. 1 which shows a building structure 10 intended to be protected from the onslaught of winds and debris typically occasioned during a hurricane. FIG. 1 shows barrier 61 deployed to completely envelop the building structure 10. In this embodiment, the roof 68 is completely covered by barrier panel 61 which has integral side panels 62 and 64 which extend from the roof to the ground. A shorter end panel 62 protects the end of the building and longer front panel 64 covers the front of the building. Of course, these panels are duplicated at the other end and rear of the building. As shown, the side panels are sloped outwardly from the roof toward the ground. This orientation creates a gap between the panels at the corners of the building. A joining panel 63, shown in FIG. 1, connects the adjacent side panels and provides a continuous barrier surrounding the structure. A joining panel is in place at all four corners of the building.

Figure 2:
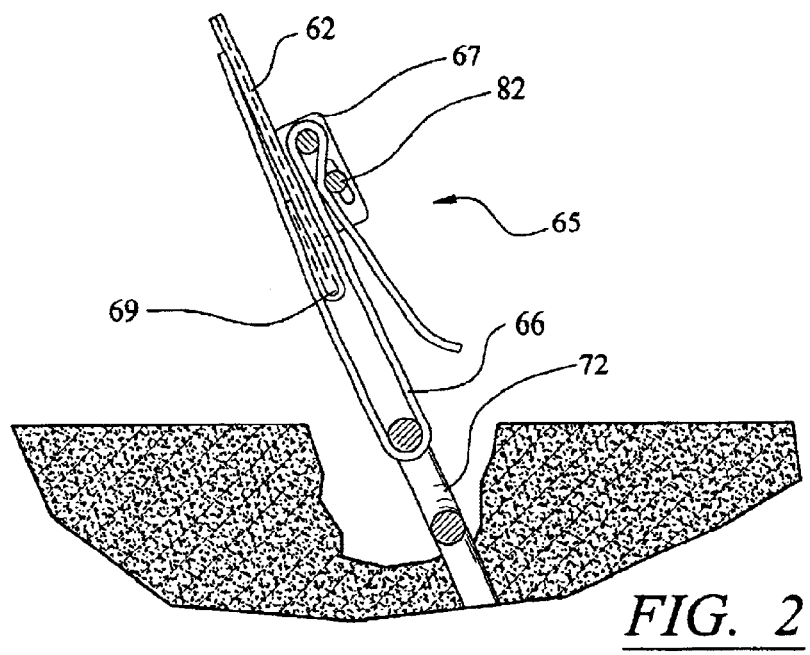
FIG. 2 is a partial view in section illustrating mechanism for tying down the protective barrier.

FIG. 2 illustrates an anchoring system 65 that provides a tie-down for the barrier side panels and joining panels which provides a holding power at least equal to the burst strength of the barrier material. As shown, the side panel 62 has a continuous folded reinforced hem 69 attached to an anchoring strap 66. The strap 66 is passed through the eye of a ground anchor 72. The ground anchor 72 is similar to the ground anchor 110, shown in FIG. 9. The free end of the strap 66 is threaded through a friction buckle 67 which has a locking roller 82. As tension is applied to the strap 66, the friction grip of roller 82 increases.

The upper margin of the side panels may have a batten 70, as shown in FIG. 4. The upper edge of the side panels may be attached to the roof beyond the batten (not shown). The batten 70 may be attached to the building over the eave 71 or to the barrier. The batten 70 serves the dual purpose of protecting the edge of the roof and providing a large diameter, smooth surface about which the barrier turns approximately 90 degrees. The batten may be made of any material which will not deform under the compression and shear created by the barrier under a wind load.

A suitable material for the barrier 61 is polypropylene formed in a monofilament and woven into a geotextile (style 20458) manufactured by Synthetic Industries of Gainesville, Ga. The fabric is woven in a basket (plain) weave as shown in FIG. 3 where the fill 11 and warp 13 threads alternately cross over and under adjacent fills and warps. In the preferred embodiment the interstices are substantially equal to 0.6 millimeters which approximates the interstices of commercially available residential window screening.

The barrier fabric may be coated or have inherent resistence to withstand the elements. A synthetic material such as polypropylene has been found to be acceptable. Also, a vinyl coated polyester may be used in the barrier. Materials intended to be used outdoors in trampolines, for example, are likely candidates for the barrier material. Such materials have a burst or failure limit of 675 pounds per square inch (psi). Black colored polypropylene is most resistant to degradation from ultraviolet (UV) radiation.

The preferred embodiment has air permeability albeit at substantially reduced rates. An upwind pressure of 1 inch of Mercury (Hg.), which is roughly equivalent to 100 miles per hour wind speed, forces air through the material at approximately 250 cubic feet per minute (cfm) or approximately 3 mph. The amount of air permeability depends on interstice size. If a weather tight and transparent curtain is desired, the polypropylene material may be laminated with a flexible clear plastic skin.

The selection of interstice size and configuration is dependent on the amount of transparency and air passage desired and the limitation that the maximum size must be sufficiently small to prevent objects that are potentially damaging on impact from passing therethrough. The above mentioned regulations set in place by Dade County, Florida have determined that the smallest diameter missile (wind blown debris) with which they are concerned is 3/8 inch in diameter. Therefore to satisfy the Dade County Regulations the interstices must be small enough to prevent 3/8 inch diameter missiles from passing therethrough. Other regulations may set other minimum missile diameter sizes. The interstice size would similarly relate thereto if the barrier were intended to satisfy said other regulations.

The endurance, physical, hydraulic and mechanical properties of the textile are recorded and available from the manufacturer, Synthetic Industries. It is important to this invention that whatever type of material is utilized, the fabric made up from this material must exhibit sufficient impact strength for resisting the test impact loads at least to the values dictated by the various industrial, insurance and government regulating agencies. This particular fabric has been shown to be able to withstand forces at over 11 times the test load required by the regulating agency presently in the forefront of standard setting.

The material selected must meet certain strength criteria. These criteria, together with the size of span covered by the barrier, constitute the basis for calculating the spacing of the barrier from the object being protected. Said spacing is calculated as follows:

1) The fabric must be sufficiently strong that the impact force it is required to withstand is less than the failure force (Mullen Burst).

2) The impact (test) force is then divided by the force required to cause failure (Mullen Burst). This quotient is then multiplied by the known stretch at failure to obtain the stretch factor. The woven polypropylene synthetic fabrics of the type used in the preferred embodiment stretch 20–22% just prior to failure, depending on manufacturing technique. This stretch information is available from the manufacturer.

3) The actual stretch measurement is then calculated and in conjunction with the span of the barrier used to ascertain the maximum deflection. This maximum deflection is the minimum distance the barrier should be spaced from the frangible object being protected.

EXAMPLE

The preferred embodiment is used as an example to demonstrate this formula. The preferred embodiment is a polypropylene, woven monofilament geotextile. The individual filaments are woven into a basket weave network and calendered so that the filaments retain dimensional stability relative to each other. This geotextile is resistant to ultra violet degradation and to biological and chemical environments normally found in soils. This fabric is often used as the mat for outdoor trampolines and is intended to be very resistant to weathering. The fabric is known to stretch a maximum of 21% prior to failure and requires a force of 675 psi to fail.

1. The present test that was originally legislated by Dade County Florrida and may become the standard in the industry, requires the barrier to withstand a force of only 61.3 psi. Consequently the fabric meets and exceeds the first requirement of strength.

1. The stretch factor calculation is (test load/maximum load×% stretch at maximum load=stretch factor) 61.3/675×21=1.9%. This becomes a constant factor insofar as this fabric and the Dade test remain involved. The calculation will change if any one or more of the strength, energy or stretch characteristics of the test or fabric are modified. Likewise, it is known that stretch varies directly with force up to the maximum at failure. To calculate the actual stretch, the calculation is stretch factor×height=actual stretch. Therefore if the distance between the two fastened sides is eight feet (96 inches), the stretch measurement will be 96×1.9%=1.83".

2. To calculate the deflection, right triangles are used such that the hypothenuse is ½ of the sum of the height plus stretch (97.83/2=48.92"). The known side is ½ of the height (96/2=48"). Thus the deflection=the square root of the difference between the square of the hypothenuse less the square of the known side. This result is 9.4" which is the maximum deflection on impact by test missile.

3. Thus to meet the prescribed standard the barrier must be mounted so as to be spaced at least 9.4 inches from the surface to be protected if an eight (8) foot span is to be used. A longer span will require wider spacing, a shorter will require less. The table shown below reflects this spacing for various sample distances of span with this preferred fabric.

Table demonstrating relationship between Span and Maximum Deflection in the Preferred Embodiment as Described Above.

| Height | Deflection |
| --- | --- |
| 8 feet | 9.4 inches |
| 10 " | 11.8 " |
| 12 " | 14.1 " |
| 14 " | 16.5 " |
| 16 " | 18.8 " |
| 18 " | 21.2 " |
| 20 " | 23.5 " |
| 22 " | 25.9 " |
| 24 " | 28.2 " |
| 30 " | 35.2 " |
| 40 " | 47.0 " |

The aforementioned formula is sufficient to provide spacing to meet the test standards. As the spacing is intended to be minimum, and although the barrier is intended to meet or exceed test standards as opposed to warranting protection in actual situations which are difficult to predict, this invention can include an additional factor in the spacing to allow for maximum wind pressure. Arbitrarily assuming a 115 mph wind at 90 degrees to the barrier and assuming the barrier has been made weather tight with no air flow through the barrier to somewhat relieve pressure, and assuming the barrier is installed at sea level where air is densest, the additional pressure on the barrier will be 0.237 pounds per linear inch of span. This additional pressure can be resolved into a vector and added directly to the test force of 61.3 pounds. Thus an 8 foot barrier will have an additional (0.237×96=) 22.75 pounds added for a total of 84.05 pounds. A 40 foot barrier will have (0.237×480=) 113.76 pounds added for a total of 175.06 pounds. This number should be substituted into the above formula to give a more accurate calculation of minimum spacing.

For example: an 8 foot barrier could deflect 10.9" when allowing for a 115 mph wind factor rather than 9.7" if the wind was not factored in. The deflection of a 40 foot barrier becomes 80.28" (6.69') rather than 47" (3.9').

Figure 6:
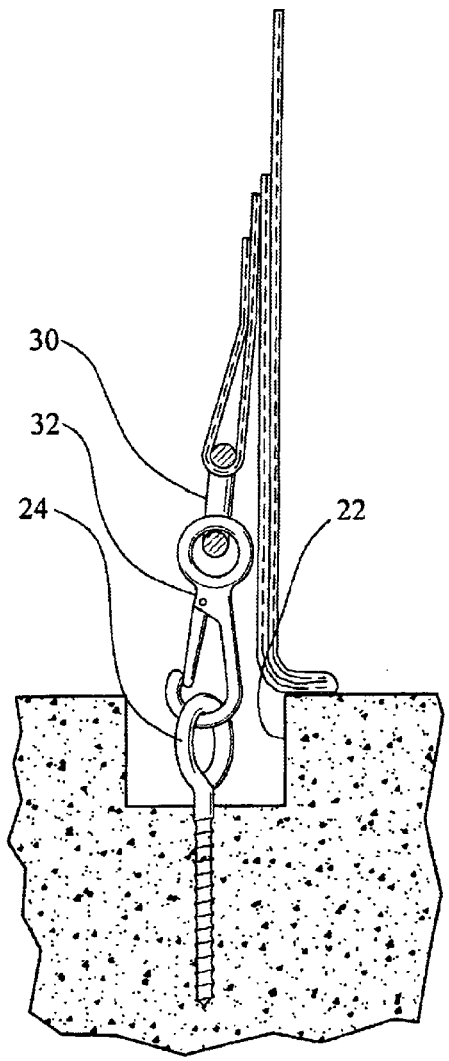
FIG. 6 is a partial section of a tie-down.
Figure 7:
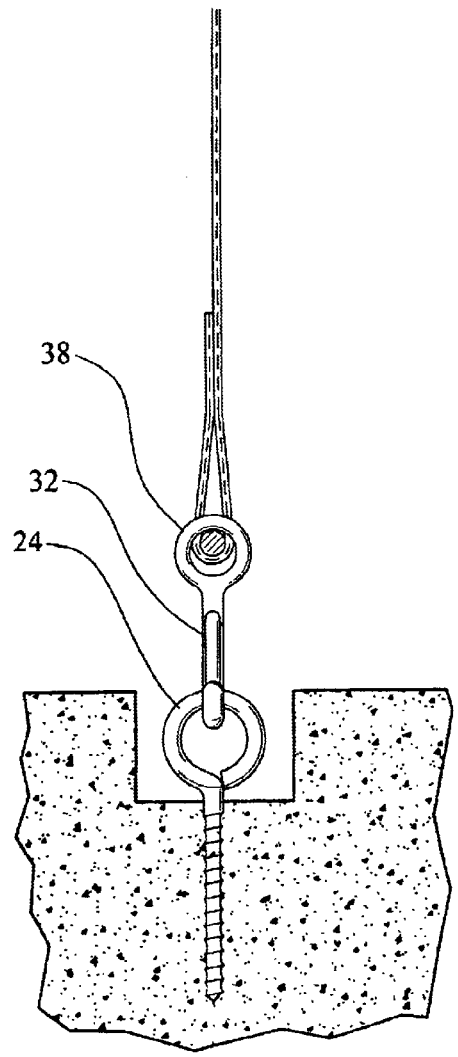
FIG. 7 is a partial section of another tie-down along line 7—7 of FIG. 8.

Obviously, once the minimum space between the barrier and the structure being protected is established, the fabric must be anchored in a suitable manner so as to absorb the loads without being torn from its support. In some installations, the building may have adjacent areas, such as a patio or pool deck or drive way, with concrete, cement or other materials. In such cases, as shown in FIGS. 6 and 7, the lower edge is fastened by anchors set in recesses 22 formed into the cement to bury or partially bury eyebolts 24. The eyebolts 24 are permanently screwed into the remaining portion of the cement. Obviously this invention contemplates other methods of anchoring the top and bottom of the curtain panels depending on the particular application.

Figure 9:
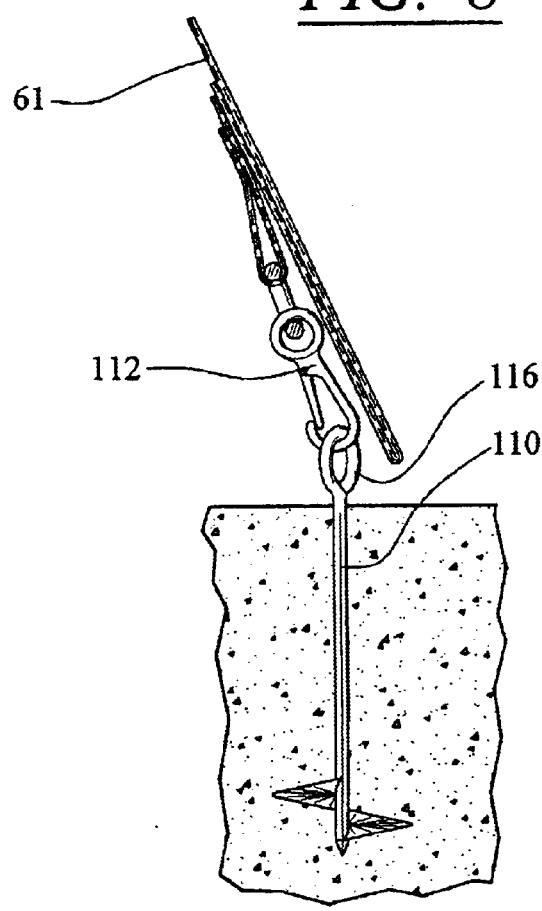
FIG. 9 is a perspective, partly in section, of a ground anchor and connection to the barrier.

In FIG. 9, the a ground anchor 110 is used to secure the barrier to the earth. These anchors may vary in design to provide the requisite holding power in different soils. The designs include ground anchors typically used to secure telephone pole guy wires to the ground. In FIG. 9, the anchor 110 has an eye 116 coupled to a clamp 112 similar to clamp 32.

Equally obvious is the fact that the sides of the panels where appropriate can likewise be anchored. As shown in FIG. 5, side edges of mating panels may be provided with releasable fasteners 76. As shown, the fastener is in the form of a zipper but other fasteners may be employed, such as hooks-and-eyes, grommets-and-turn posts, male-and-female snaps, or button-and-holes. The fastener 76 is protected by a fly 73 attached along the length of the fastener to one panel. The fly has a cohesive closure, such as Velcro, with the cooperating tapes 78 disposed on the free edge of the fly and on the other panel. As shown, the joining panel 63 has a releasable fastener 76 along one edge and a fly 73 attached parallel with the fastener. Side panel 64 has a cooperating member of the fastener 76 attached along one edge and a closure strip parallel to the fastener.

Figure 8:
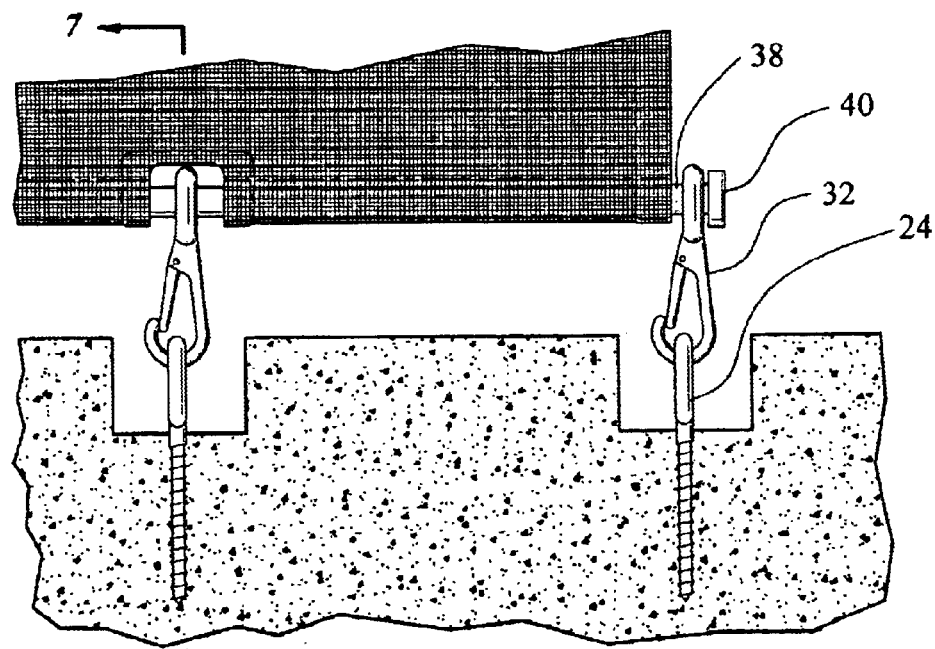
FIG. 8 is a perspective, partly in section, of the tie-down of FIG. 7.

The panels may also be fabricated with a selvage or hem or can utilize a reinforcing tape such as "Polytape" that is made from a polypropylene material. The selvage or tape may include commercially available grommets or rings to accept the tie-down hardware. The attachment ring 30 carries a self-locking clamp 32 adapted to fit the eyebolt 24 to tie down the curtain. In FIG. 7 clamp 32 captures a rod 38 and clamps to the eyebolt 24. In the FIG. 8 embodiment the clamp 32 is fitted to a sturdy rod 38 running the length of the bottom edge of the barrier that is secured in the hem formed by folding the material of the curtain as shown. In FIG. 8 the end cap 40 can serve as a glide in a track if end tracks (not shown) are desired for raising and lowering the barrier. An automatic deployment system could require such end tracks. The same reference numerals depict like parts in all the FIGS. Commercially available grommets or attached rings 30 may be utilized to hold the clamp 32. In this manner the curtain is anchored via the clamp 32 and eyebolt 24. Rod 38 may include an end cap 40 mounted on the end thereof to prevent the rod from falling out of the loop of the curtain.

One method of rolling up the curtain in order to move it out of the way when not in use requires a pull cord (not shown) that is looped around the end of the rod 38. The free end freely hangs and allows the operator to pull or release it to roll up or let down the curtain as required. Ideally the deployed curtain should only be sufficiently taunt to take out slack. If during the installation slack is left this should be allowed for in calculating the said minimum spacing.

The edges at the top and bottom of each panel of the curtain are folded over one or two times, forming a hem, to assure the structural integrity of the panels. The side edges of the curtains may be suitably attached to the siding of the building (not shown) in which the material is wrapped around a batten, such as batten 70, which is in turn fastened to the wall with appropriate screws.

Figure 10:
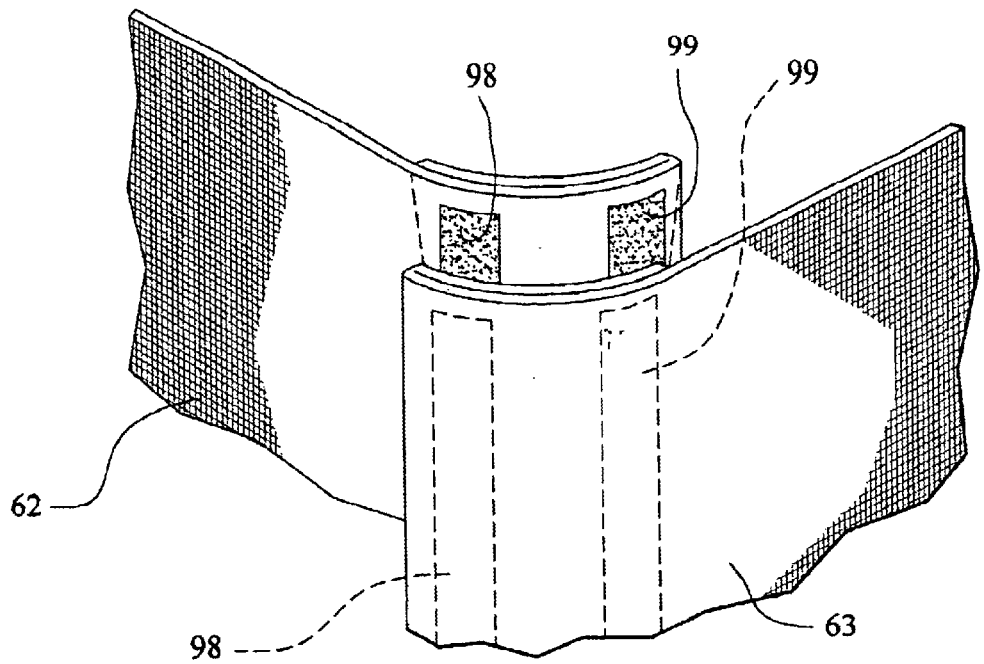
FIG. 10 is a perspective of an edge closure.
Figure 11:
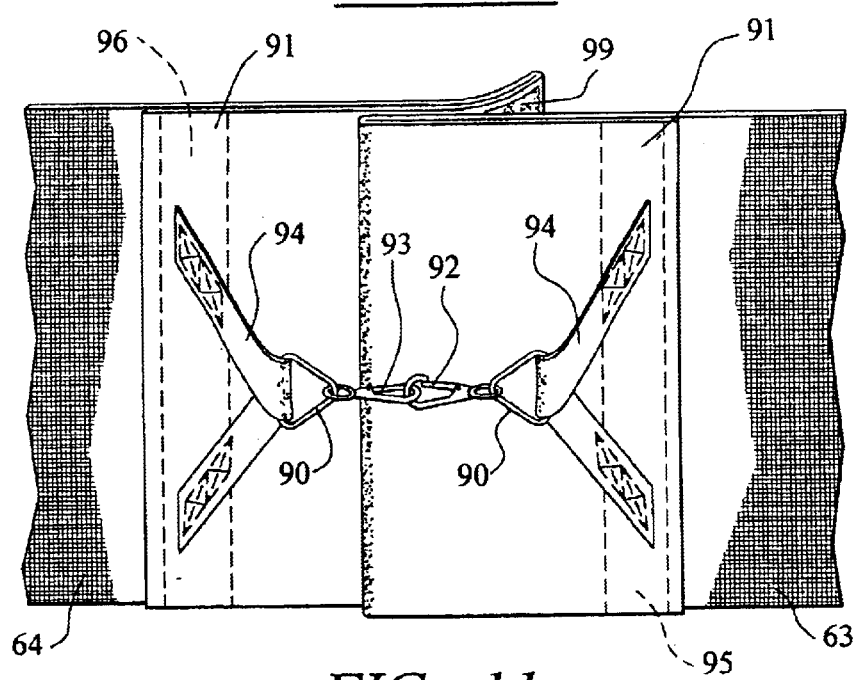
FIG. 11 is a perspective of another edge closure.

Alternative end fastenings are shown in FIGS. 10 and 11 wherein the ends are overlapped and releasably secured one to the other. In FIG. 10, the hemmed edge of side panel 62 is connected to joining panel 63 using two parallel strips 98, 99 of cohesive releasable fastener material on each panel. The joining panel 63 is releasably connected to side panel 64, as shown in FIG. 11, through the hemmed edges which have reinforcing tapes 95 and 96. A plurality of loops 94 are fixed along the length of the edges with each loop threaded through a ring 90 in a butterfly pattern. As shown, the loops 94 on panel 63 are connected to releasable clamps 92. The clamps 92 cooperate with a double ended ring 90. The double ended rings 90 are attached to the loops on panel 64. To close the air gap at the extreme edges of the panels, a cohesive fastener 99, such as Velcro, is attached to both panels. The reinforcing tapes and the loops may be of the same material as the barrier.

What is shown by this invention is a simple, adaptable, transparent, economical, and aesthetically pleasing device that is suitable to protect the building, doors and windows from the forces of winds occasioned by hurricanes and the debris carried by the winds. The textile barrier can either be removed and stored in a very simple manner without requiring a lot of space or could remain installed and either rolled, swung or slid out of the way.

Although this invention has been shown and described with respect to detailed embodiments thereof, it will be appreciated and understood by those skilled in the art that various changes in form and detail thereof may be made without departing from the spirit and scope of the claimed invention.

I claim:

1. A process for maintaining integrity of a structure containing frangible portions subject to impact from wind-borne objects comprising:

providing a protective barrier device formed of a flexible mesh material having a burst strength greater than 61.3 psi and an interstice size constructed and arranged to prevent passage of wind-borne objects greater than about $3/16$ inch diameter;

positioning said protective barrier device in juxtaposed relation to said frangible portions of said structure; and securing said protective barrier to said structure;

wherein said protective barrier provides reduction of wind force sufficient to maintain the integrity of said structure and said protective barrier device is resistant to ultra violet, biological, and chemical degradation.

2. The process of claim 1 wherein said protective barrier device is formed as at least one panel including a peripheral hem adapted to secure said panel to said structure.

3. The process of claim 1 wherein said protective barrier device is a textile formed from synthetic threads.

4. The process of claim 2 wherein said synthetic threads are polypropylene.

5. The process of claim 2 wherein said synthetic threads are vinyl-coated polyester.

6. The process of claim 2 wherein said panel is transparent.

7. The process of claim 2 wherein said panel includes a superposed layer of continuous film.

8. The process according to claim 1 further including a step of:

providing a plurality of releasable fasteners for attachment of said protective barrier to said structure.

9. The process according to claim 2 wherein said protective barrier includes a plurality of said panels, each said panel having parallel edges being releasably connected to said structure by a plurality of cooperating releasable fasteners spaced therealong.

10. The process in accordance with claim 9 wherein said spaced fasteners are reinforced with a tape.

11. The process in accordance with claim 8 wherein said tape is polypropylene.

* * * * *

(12) EX PARTE REEXAMINATION CERTIFICATE (8247th)
United States Patent
Gower

(10) Number: US 6,865,852 C1
(45) Certificate Issued: May 17, 2011

(54) FLEXIBLE WIND ABATEMENT SYSTEM

(75) Inventor: Ted Gower, North Palm Beach, FL (US)

(73) Assignee: Armor Screen Corporation, Riviera Beach, FL (US)

Reexamination Request:
No. 90/009,418, Feb. 25, 2009

Reexamination Certificate for:
Patent No.: 6,865,852
Issued: Mar. 15, 2005
Appl. No.: 10/033,030
Filed: Nov. 9, 2001

Related U.S. Application Data

(63) Continuation-in-part of application No. 09/565,211, filed on May 4, 2000, now Pat. No. 6,325,085, which is a continuation of application No. 09/270,249, filed on Mar. 15, 1999, now Pat. No. 6,176,050, which is a continuation-in-part of application No. 08/861,209, filed on May 21, 1997, now abandoned.

(51) Int. Cl.
*E04B 1/00* (2006.01)
*E04H 9/14* (2006.01)

(52) U.S. Cl. ........... 52/222; 52/4; 52/23; 52/155; 52/202; 52/204.1; 52/273; 52/506.01; 135/90; 135/222; 248/85; 248/87; 248/156; 160/327; 160/368.1; 160/371; 160/DIG. 1; 245/2; 245/5

(58) Field of Classification Search ............. 52/4, 52/DIG. 12; 135/119; 160/368.1
See application file for complete search history.

(56) References Cited

U.S. PATENT DOCUMENTS

| | | |
|---|---|---|
| 210,005 A | 1/1878 | Burt |
| 351,860 A | 11/1886 | Glidden |
| 354,342 A | 12/1886 | Pratt |
| 362,774 A | 5/1887 | Nevison |
| 490,780 A | 1/1893 | Zimmerman |
| 492,298 A | 2/1893 | Johnson |
| 636,548 A | 11/1899 | Owen |
| 644,242 A | 2/1900 | Combs |
| 671,912 A | 4/1901 | Woodward |
| 715,185 A | 12/1902 | Warner |
| 928,039 A | 7/1909 | Gabler |
| 960,270 A | 6/1910 | Butler |

(Continued)

FOREIGN PATENT DOCUMENTS

| | | |
|---|---|---|
| CA | 2209249 | 2/1999 |
| CA | 2247828 | 3/2000 |
| CN | 107182 | 5/1993 |

(Continued)

OTHER PUBLICATIONS

Showcase of 1998 Governor's Hurricane Conference Exhibitors: Armor Screen Ltd. (conference Jun. 1, 1998-Jun. 5, 1998), 3 pgs.

Synthetic Industries, Woven Synthetic Fabric samples (sent May 8, 1998), 17 pgs.

(Continued)

*Primary Examiner*—Robert M. Fetsuga

(57) ABSTRACT

A device for protection of property against high winds comprising a flexible material of predetermined strength and stretch characteristics, and in the form of a panel or several panels, utilized to protect the side of a structure including its windows and doors from the strong winds and debris impacts occurring during a hurricane. The device is anchored in a manner to space it out from the area being protected according to formula provided, and can safely dissipate substantial impacting energy. The preferred embodiment attaches to an overhanging eave and the ground below protecting in addition to the windows and doors, plantings, outdoor furniture, decorative shutters, downspouts, and such as are enclosed behind the barrier. Several methods of storage and deployment of said curtain are described including rolling, sliding, and converting to awning. The barrier has the added feature of acting as a tie down in certain applications.

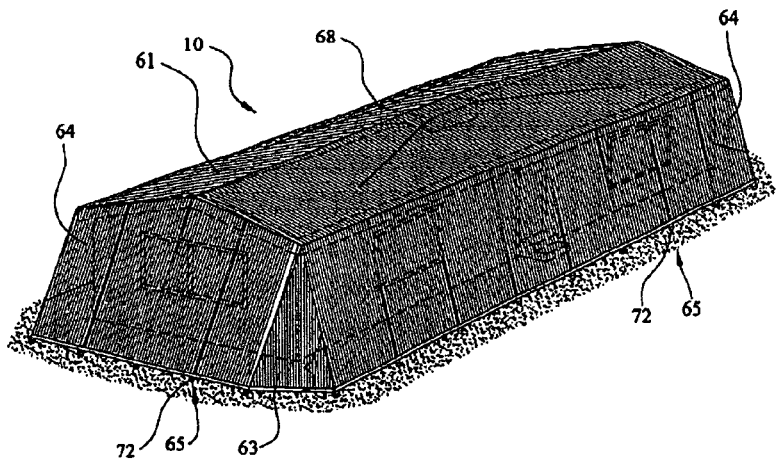

U.S. PATENT DOCUMENTS

| | | | |
|---|---|---|---|
| 964,455 A | 7/1910 | Smith | |
| 970,135 A | 9/1910 | Taylor | |
| 1,009,783 A | 11/1911 | Padley | |
| 1,164,385 A | 12/1915 | Neupauer | |
| 1,241,425 A | 9/1917 | Nelson | |
| 1,260,612 A * | 3/1918 | Whall | 135/119 X |
| 1,350,027 A | 8/1920 | Lane | |
| 1,400,251 A | 12/1921 | Van Cott | |
| 1,520,486 A | 12/1924 | Sodemann | |
| 1,580,287 A | 4/1926 | Colle et al. | |
| 1,583,133 A | 5/1926 | Fierman | |
| 1,600,749 A | 9/1926 | Barnes | |
| 1,884,449 A | 10/1932 | Wickstrum | |
| 1,983,617 A | 12/1934 | Ladon | |
| 2,136,042 A | 11/1938 | Cornell et al. | |
| 2,167,592 A | 7/1939 | Smalley, Jr. | |
| 2,351,297 A | 6/1944 | Schwab | |
| 2,365,127 A | 12/1944 | Wagner | |
| 2,455,237 A | 11/1948 | Davis | |
| 2,520,625 A | 8/1950 | Dean | |
| 2,522,509 A | 9/1950 | Fridolph | |
| 2,599,429 A | 6/1952 | Bernhard | |
| 2,643,539 A | 6/1953 | Bouch | |
| 2,730,150 A | 1/1956 | Wunderwald et al. | |
| 2,771,384 A | 11/1956 | Collins | |
| 2,823,156 A | 2/1958 | Hedges | |
| 2,836,529 A | 5/1958 | Morris | |
| 2,847,065 A | 8/1958 | Tolman et al. | |
| 2,921,592 A | 1/1960 | Mackey | |
| 3,020,951 A | 2/1962 | Graulich | |
| 3,054,151 A | 9/1962 | Shankland | |
| 3,121,470 A | 2/1964 | Stone et al. | |
| 3,224,495 A | 12/1965 | Truesdale | |
| 3,242,623 A | 3/1966 | Brisse | |
| 3,288,159 A | 11/1966 | Corliss | |
| 3,327,724 A | 6/1967 | Nielsen | |
| 3,335,531 A | 8/1967 | Grimelli et al. | |
| 3,355,745 A | 12/1967 | Jannuzzi | |
| 3,373,464 A | 3/1968 | Ausnit | |
| 3,409,907 A | 11/1968 | Barratt | |
| 3,416,762 A | 12/1968 | Headrick | |
| 3,449,874 A | 6/1969 | Beaupre | |
| 3,483,912 A | 12/1969 | Andrews | |
| 3,548,904 A | 12/1970 | Mackell | |
| 3,552,476 A | 1/1971 | Le Tarte | |
| 3,563,836 A | 2/1971 | Dunbar | |
| 3,583,465 A | 6/1971 | Youngs et al. | |
| 3,659,641 A | 5/1972 | Marino | |
| 3,696,857 A | 10/1972 | Le Tarte | |
| 3,715,843 A | 2/1973 | Ballinger | |
| 3,744,192 A | 7/1973 | Burnett | |
| 3,747,288 A | 7/1973 | Grimelii | |
| 3,763,917 A * | 10/1973 | Antinone | 160/368.1 X |
| 3,764,446 A | 10/1973 | Martin | |
| 3,769,764 A | 11/1973 | Young | |
| 3,783,766 A | 1/1974 | Boucher | |
| 3,787,272 A | 1/1974 | Nisbet et al. | |
| 3,788,216 A | 1/1974 | Lambert | |
| 3,805,816 A | 4/1974 | Nolte | |
| 3,806,391 A | 4/1974 | Clay et al. | |
| 3,829,899 A | 8/1974 | Davis | |
| 3,848,367 A | 11/1974 | Barnes | |
| 3,853,166 A | 12/1974 | Wrono | |
| 3,862,876 A | 1/1975 | Graves | |
| 3,869,836 A | 3/1975 | Allen | |
| 3,871,142 A | 3/1975 | Abbott | |
| 3,879,905 A | 4/1975 | Catalano, Sr. | |
| 3,913,655 A | 10/1975 | Ogino | |
| 3,937,437 A | 2/1976 | Stewart | |
| 3,949,527 A | 4/1976 | Double et al. | |
| 3,949,834 A | 4/1976 | Nusbaum | |
| 4,070,802 A | 1/1978 | Odom | |
| 4,084,360 A | 4/1978 | Reckson | |
| 4,122,637 A | 10/1978 | Runge et al. | |
| 4,148,162 A | 4/1979 | Goodrich | |
| 4,148,724 A | 4/1979 | Hannon | |
| 4,175,576 A | 11/1979 | Iby | |
| 4,180,352 A | 12/1979 | Divers et al. | |
| 4,222,401 A | 9/1980 | Allweil | |
| 4,252,850 A | 2/1981 | de Winter | |
| 4,259,819 A | 4/1981 | Wemyss | |
| 4,283,888 A | 8/1981 | Cros | |
| 4,290,243 A | 9/1981 | Mellin | |
| 4,397,122 A | 8/1983 | Cros | |
| 4,413,029 A | 11/1983 | Handwerker | |
| 4,429,952 A | 2/1984 | Dominguez | |
| 4,443,506 A | 4/1984 | Schmolmann et al. | |
| 4,484,420 A | 11/1984 | Stokes | |
| 4,487,212 A | 12/1984 | Moore | |
| 4,569,515 A | 2/1986 | Gordon | |
| 4,590,714 A | 5/1986 | Walker | |
| 4,613,096 A | 9/1986 | Pugh | |
| 4,619,305 A | 10/1986 | Corneau | |
| 4,623,574 A | 11/1986 | Harpell et al. | |
| 4,644,684 A | 2/1987 | Verbeeck | |
| 4,662,038 A | 5/1987 | Walker | |
| 4,764,142 A | 8/1988 | Griffith et al. | |
| 4,815,562 A | 3/1989 | Denny et al. | |
| 4,848,386 A | 7/1989 | Cooper | |
| 4,858,395 A | 8/1989 | McQuirk | |
| 4,874,028 A | 10/1989 | Lynch et al. | |
| 4,889,176 A | 12/1989 | Nilsson | |
| 4,897,970 A | 2/1990 | Double et al. | |
| 4,905,821 A | 3/1990 | Corbett | |
| 4,931,320 A | 6/1990 | Leonard | |
| 4,932,457 A * | 6/1990 | Duncan | 160/380 |
| 4,934,435 A | 6/1990 | Regev | |
| 5,020,254 A | 6/1991 | Sheppard | |
| 5,046,546 A * | 9/1991 | Benedyk et al. | 160/371 |
| 5,079,048 A | 1/1992 | Anitole | |
| 5,099,905 A | 3/1992 | Rigter | |
| 5,123,473 A | 6/1992 | Henkenjohann | |
| 5,141,046 A | 8/1992 | Duncan | |
| 5,174,073 A | 12/1992 | Sabo | |
| 5,175,040 A | 12/1992 | Harpell et al. | |
| 5,192,574 A | 3/1993 | Hunt et al. | |
| 5,197,236 A | 3/1993 | Calhoun et al. | |
| 5,199,479 A | 4/1993 | Kraeutler | |
| 5,237,788 A | 8/1993 | Sandow | |
| 5,238,284 A | 8/1993 | Whitaker | |
| 5,287,908 A | 2/1994 | Hoffmann et al. | |
| 5,301,737 A | 4/1994 | Martin | |
| 5,319,896 A | 6/1994 | Winger | |
| 5,323,831 A | 6/1994 | Manthei | |
| 5,332,101 A | 7/1994 | Bakula | |
| 5,345,716 A | 9/1994 | Caplan | |
| 5,347,768 A | 9/1994 | Pineda | |
| 5,355,640 A | 10/1994 | Frye | |
| 5,383,950 A | 1/1995 | Hashemi et al. | |
| 5,426,893 A | 6/1995 | Hoffman | |
| 5,443,563 A | 8/1995 | Hindel et al. | |
| 5,456,305 A | 10/1995 | Snarli | |
| 5,457,921 A | 10/1995 | Kostrzecha | |
| 5,466,503 A | 11/1995 | Dischler | |
| 5,472,037 A | 12/1995 | Hoffman | |
| 5,487,244 A | 1/1996 | Hill | |
| 5,519,965 A | 5/1996 | Robinson | |
| 5,522,165 A | 6/1996 | Molla | |
| 5,522,184 A | 6/1996 | Oviedo-Reyes | |
| 5,531,239 A | 7/1996 | Hannah, Jr. | |
| 5,535,565 A | 7/1996 | Majnaric et al. | |

| | | |
|---|---|---|
| 5,570,542 A | 11/1996 | Cameron |
| 5,575,322 A | 11/1996 | Miller |
| 5,579,794 A | 12/1996 | Sporta |
| 5,595,233 A | 1/1997 | Gower |
| 5,596,849 A | 1/1997 | Hill |
| 5,599,440 A | 2/1997 | Stangeland et al. |
| 5,603,190 A | 2/1997 | Sanford |
| 5,620,040 A | 4/1997 | Swanner |
| 5,632,839 A | 5/1997 | Kish et al. |
| 5,639,806 A | 6/1997 | Johnson et al. |
| 5,651,221 A | 7/1997 | Golen |
| 5,687,512 A | 11/1997 | Spoozak et al. |
| 5,720,137 A | 2/1998 | Rodriquez |
| 5,787,955 A | 8/1998 | Dargie |
| 5,791,090 A | 8/1998 | Gitlin et al. |
| 5,832,666 A | 11/1998 | Flack, II et al. |
| 5,852,903 A | 12/1998 | Astrizky |
| 5,862,850 A | 1/1999 | Yang |
| 5,915,449 A | 6/1999 | Schwartz |
| 5,927,028 A | 7/1999 | Rossi |
| 5,941,031 A | 8/1999 | Fullwood |
| 5,950,384 A | 9/1999 | Aarness |
| 5,956,903 A | 9/1999 | Parker |
| 5,964,270 A | 10/1999 | Kirkey et al. |
| 5,966,877 A * | 10/1999 | Hawes .................... 52/4 X |
| 5,996,292 A | 12/1999 | Hill et al. |
| 6,015,184 A | 1/2000 | Ewing et al. |
| 6,070,629 A | 6/2000 | Whiteside |
| 6,079,168 A | 6/2000 | Shaver |
| 6,109,283 A | 8/2000 | Burke et al. |
| 6,116,319 A | 9/2000 | Simon |
| 6,122,868 A | 9/2000 | Knezevich |
| 6,155,326 A | 12/2000 | Imhoff et al. |
| 6,161,339 A | 12/2000 | Cornett, Sr. et al. |
| 6,176,050 B1 | 1/2001 | Gower |
| 6,230,455 B1 | 5/2001 | Arehart et al. |
| 6,263,949 B1 | 7/2001 | Guthrie, Jr. |
| 6,286,579 B1 | 9/2001 | Gottschalk |
| 6,325,085 B1 | 12/2001 | Gower |
| 6,341,455 B1 | 1/2002 | Gunn |
| 6,345,476 B1 | 2/2002 | Hill |
| 6,412,540 B2 | 7/2002 | Hendee |
| 6,439,644 B1 | 8/2002 | Jester |
| 6,851,464 B2 | 2/2005 | Hudoba et al. |
| 6,856,852 B1 | 2/2005 | Bruinsma et al. |
| 6,865,852 B2 | 3/2005 | Gower |
| 6,886,299 B2 | 5/2005 | Gower |
| 6,886,300 B2 | 5/2005 | Hudoba et al. |
| 6,948,764 B1 | 9/2005 | Haddock |
| 6,964,447 B2 | 11/2005 | McNamee |
| 7,032,402 B2 | 4/2006 | Braswell |
| 7,036,798 B1 | 5/2006 | Olson |
| 2002/0008155 A1 | 1/2002 | Uram |
| 2002/0056235 A1 | 5/2002 | Olson et al. |
| 2003/0178154 A1 | 9/2003 | DeRosa |
| 2004/0159345 A1 | 8/2004 | Gower |
| 2004/0221534 A1 | 11/2004 | Hanks |
| 2005/0279465 A1 | 12/2005 | Gower |

FOREIGN PATENT DOCUMENTS

| | | |
|---|---|---|
| CN | 1258440 | 7/2000 |
| CN | 1673463 | 9/2005 |
| FR | 2698119 | 5/1994 |
| GB | 190615053 | of 1906 |
| GB | 190710246 | of 1908 |
| GB | 191119629 | of 1912 |
| GB | 127655 | 6/1919 |
| GB | 129357 | 7/1919 |
| GB | 146047 | 7/1920 |
| IL | 102215 | 10/1996 |
| JP | 6317047 | 11/1994 |
| JP | 2001095397 | 4/2001 |
| JP | 2002201876 | 7/2002 |
| JP | 2005036603 | 2/2005 |
| JP | 2005171739 | 6/2005 |
| MX | PA04003482 | 7/2004 |
| MX | PA03005787 | 5/2005 |
| RU | 2150134 | 5/2000 |
| RU | 2228020 | 5/2004 |
| WO | WO-0025641 | 5/2000 |
| WO | WO-2004018821 | 3/2004 |

OTHER PUBLICATIONS

Unitex, Eplus Polypropylene Webbing Specifications and Samples, 4 pgs.
Ibena, Inc., Intex: Industrial Textiles, Samples of Polypropylene Fabrics (sent May 13, 1998), 2 pgs.
Fabrene, Inc., Industrial Synthetic Fabric Specifications and Samples (specifications dated Aug. 24, 1995, Nov. 6, 1997, Aug. 21, 1995, and Jan. 8, 1997), 27 pgs.
Amoco Fabrics and Fibers Company, Bulk Bag Fabrics, 11 pgs.
Amoco Fabrics and Fibers Company, Woven Geotextiles (copyright 1998), 8 pgs.
Baycor Products, Industrial Fabrics Catalog, 26 pgs.
Allied Signal Fibers, Spectra: The Performance Advantage (copyrights 1991, 1993), 21 pgs.
Allied Signal Fibers, Spectra (copyright 1991), 10 pgs.
Net Systems, Inc., Ultra Cross Spectra Netting, 4 pgs.
Honeywell Performance Fibers, Spectra Guard: Cut Resistant Engineered Yarn (copyright 2001), 2 pgs.
SI Geosolutions, Product Data Sheets (dated Nov. 1, 2000 and Nov. 20, 2000), 3 pgs.
Hendee Corp., Force 12 Panel Mounting Drawings (various revisions Mar. 14, 2001 to Jul. 19, 2001), 9 pgs.
American Society of Civil Engineers, Wind Loads for Buildings and Other Structures, Miami–Dade Community College (presented Aug. 17, 2000 to Aug. 18, 2000), 241 pgs.
PAK Unlimited Inc., Greenhouse & Nursery Fabrics, PAK Sun Screen, 1 pg.
Parsons Infrastructure & Technology Group Inc., Window Protection System for FAA Drawings (sent Apr. 13, 1996), 2 pgs.
Net Systems, Inc., Ultra Cross Netting (sent Dec. 9, 1993), 1 pg.
I.M.P. Group Limited, Nylon Braided Twines and Polyethylene Braided Twines, 1 pg.
Roxford Fordel, Roxgard ScafNet and ScafGard Material Testing for Richard Morgan (sent Jul. 15, 1994), 2 pgs.
Baycor, Trampoline Fabrics: Woven Recreational Fabrics, Technical Data and Product Description, 6 pgs.
Hendee Enterprises, Inc. Enduro Products, Enduro Shade Fabric Sample Book (copyright 1991), 3 pgs.
Parsons Infrastructure & Technology Group Inc., Cab Window Protection System Structural Analysis and Design for U.S. Dept. of Transportation Federal Aviation Admin. Southern Region, St. Thomas Airport Traffic Control Tower (dated Jul. 8, 1996), 31 pgs.
Net Systems Inc., Window Protection System Drawings (dated Jun. 1996), 2 pgs.
Parsons Infrastructure & Technology Group Inc., St. Thomas ATCT Window Protection System, Sketch SK–1 (dated Jun. 6, 1996), 4 pgs.
Parsons Infrastructure & Technology Group Inc., St. Thomas ATCT Window Protection System, Sketches SK–1 to SK–3 (Jun. 6, 1996), 3 pgs.

Dupont, Properties of DuPont Industrial Filament Yarns: DuPont Nylon, Cordura Nylon, Dacron Polyester, Nomex Aramid, Teflon Fluorocarbon, Kevlar Aramid, Multifiber Bulletin X–273 (dated Apr. 1993), 18 pgs.

Allied Signal Fibers, High Performance Commercial Fishing Ropes (copyright 1991), 2 pgs.

Spectron 12 Single Braid, 1 pg.

Net Systems Inc., Ultra Cross Spectra information (sent Jan. 5, 1996), 3 pgs.

Nor'Eastern Trawl (NET) Systems Inc., Views from the Headrope (Fall 1995), 8 pgs.

Hendee Enterprises Inc., Force 12 Protection High Impact Wind Screen (copyright 2001), 12 pgs.

Hendee Enterprises Inc., Force 12 Panel Mounting Cross Sections Drawings (dated May 3, 2000), 4 pgs.

Allied Signal Fibers, Stopping Power: Advanced Armor Applications For Spectra Fiber And Spectra Shield Composite (copyright 1994), 20 pgs.

Clemson University Dept. of Civil Engineering, Enhanced Protection from Severe Wind Storms: Options for Improving Shelter in Conventional Wood Frame Construction (submitted to FEMA) (dated Jan. 15, 2000), 113 pgs.

Synthetic Industries Performance Fabrics Division, Style 20458: Woven Monofilament Geotextile (sent Aug. 30, 1996), 1 pg.

Memo to Hurricane Test Laboratory, Inc. from Ted Gower, Re: Armor Screen certification testing (dated Mar. 30, 1998), 2 pgs.

Synthetic Industries Performance Fabrics Division, Style 20458: Woven Monofilament Geotextile (sent Mar. 30, 1998), 1 pg.

Hoechst Celanese Advance Materials Group, Celcon Acetal Copolymer: Product Data Sheet (dated Nov. 19, 1992), 1 pg.

Delrin information and Typical Properties of Delrin (sent Mar. 30, 1998), 3 pgs.

Spaenaur, Information on Ladderloc and Triglide Buckles (sent Mar. 30, 1998), 2 pgs.

Heminway & Bartlett, Machine Threads Colors (sent Mar. 30, 1998), 1 pg.

Heminway & Bartlett, Thread Hembob Needle Data (sent Mar. 30, 1998), 1 pg.

Chicago Turned Eye Bolts, Eyes Closed and Welded (sent Mar. 30, 1998), 1 pg.

FEMA, Building Performance: Hurricane Andrew in Florida: Observations, Recommendations, and Technical Guidance (dated Dec. 21, 1992), 169 total pgs.

Synthetic Industries Performance Fabrics Division, Style 20458: Typical Fabric Properties (dated Sep. 1998), 1 pg.

Lowy Enterprises, Nylon Webbing: Binding Tape Tubular Seatbelt (sent 2000), 1 pg.

Tropical Storm Shield, Inc., Wind Abatement Canvas System Drawings (dated Feb. 25, 2001), 2 pgs.

Armor Screen Corporation, Material Specification (dated Oct. 12, 2000), 1 pg.

Howard A. Perko, Basic Helix Pier Engineering for Installation Contractors, Rough Draft (dated Oct. 15, 2000), 36 total pgs.

Armor Screen Brochure: Strength Made Simple © 2000, 9 pgs.

TC Baycor Testing Results (Sep. 22, 2000), 1 pg.

TC Baycor—Style Compositions (Nov. 2000), 1 pg.

TC Mirafi Technical Data Sheets for Mirafi Filterweave 403 and Mirafi 51100, Oct. 7, 1998, 4 pgs.

TC Baycor Brochure, Aug. 25, 2000, 17 pgs.

TC Baycor—Test Results for Permatron (R) trampoline material (Sep. 25, 1998), 3 pgs.

TC Baycor—Testing for 24109 Fabric (Oct. 15, 1998), 4 pgs.

TC Baycor—Conopy Fabric Style 51400 Specifications (Jul. 14, 1997), 1 pg.

Armor Screen Specifications (Jun. 1, 1998), 14 pgs.

Fabrene Industrial Synthetic Fabrics (Aug. 8, 1995), 16 pgs.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

* * * * *